Feb. 13, 1951 E. E. WEMP 2,541,452
TRANSMISSION OF POWER
Original Filed Oct. 4, 1944 6 Sheets-Sheet 1
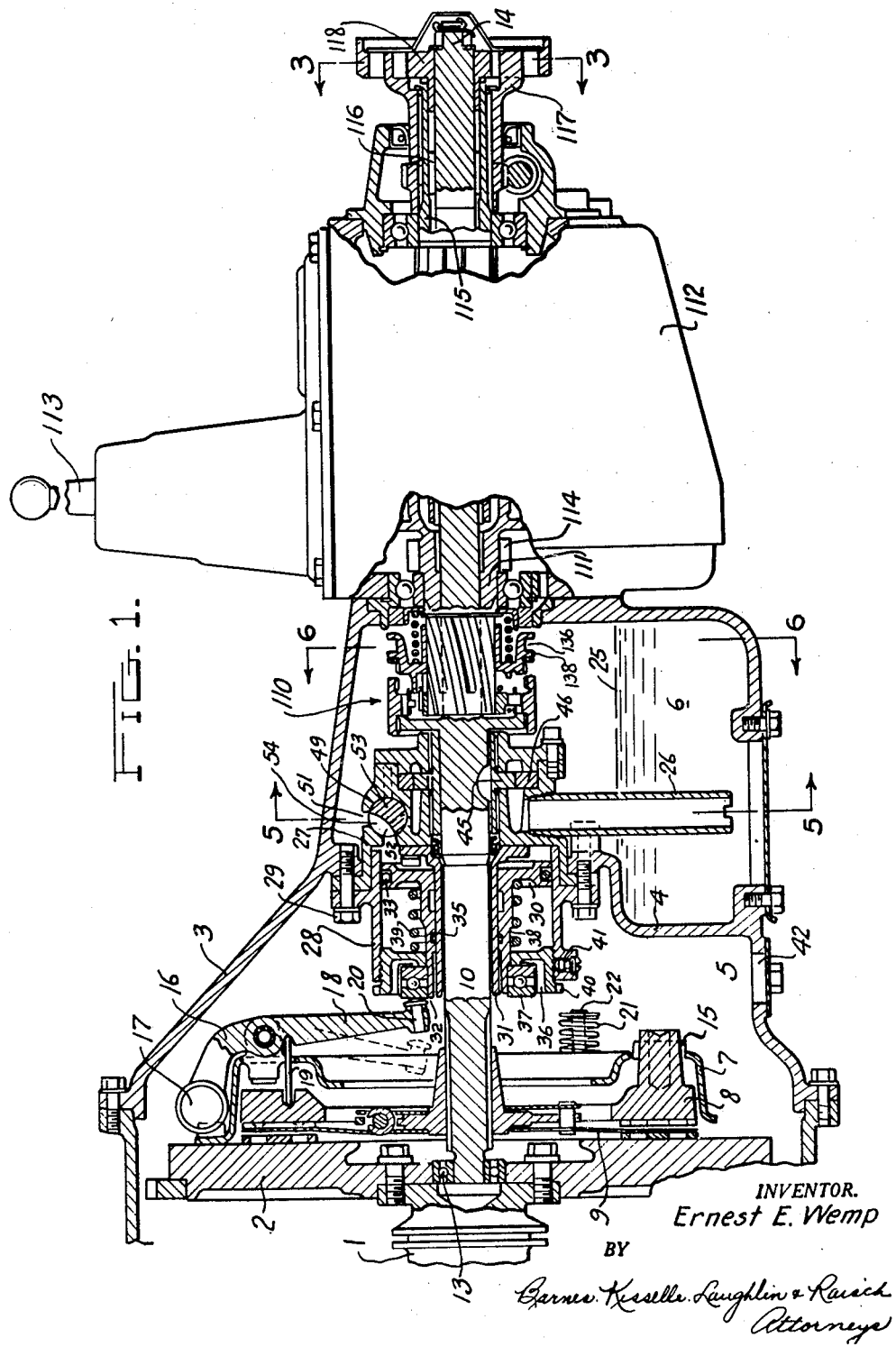
INVENTOR.
Ernest E. Wemp
BY
Barnes, Kisselle, Laughlin & Raisch
Attorneys

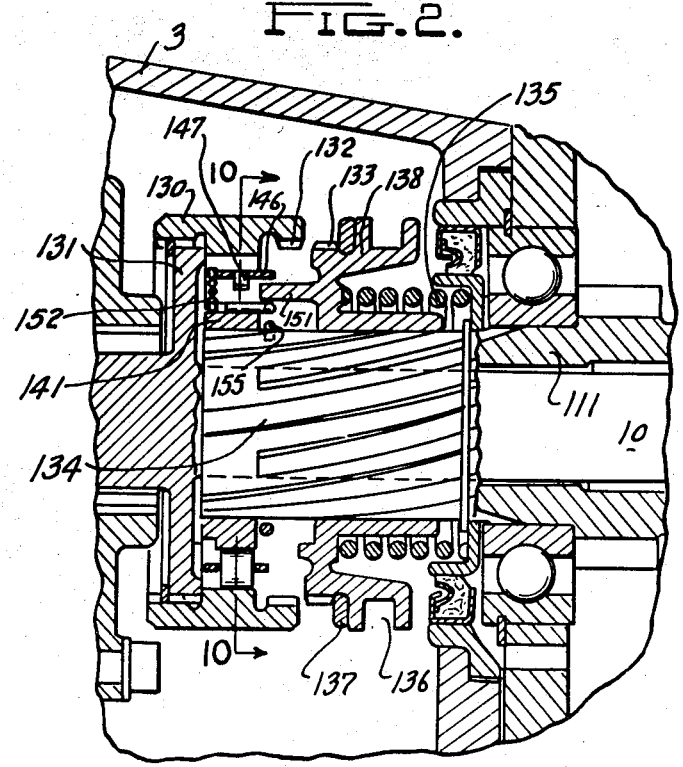
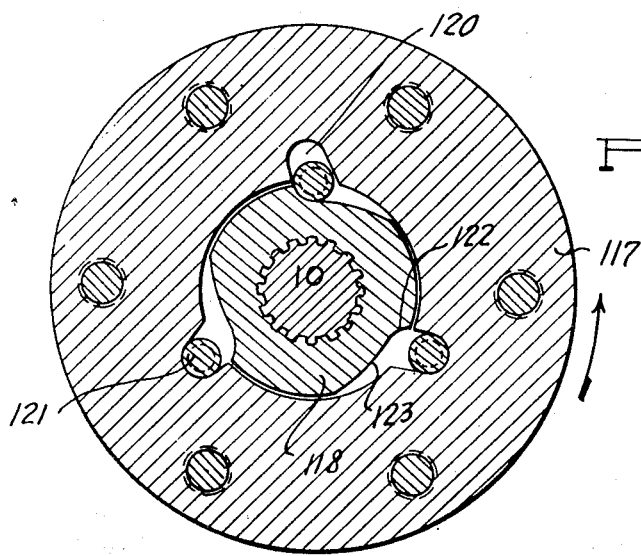

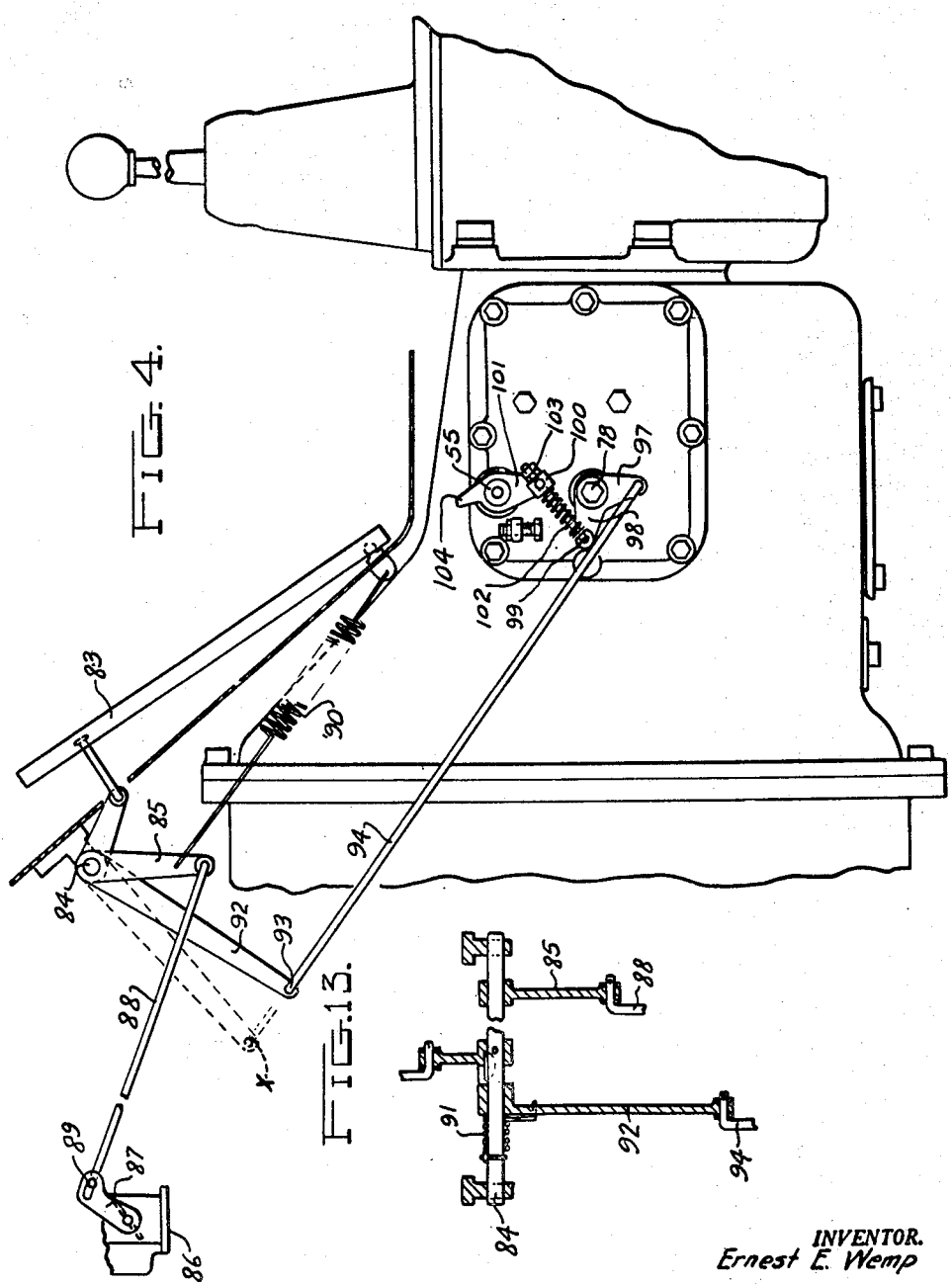

Feb. 13, 1951 E. E. WEMP 2,541,452
TRANSMISSION OF POWER
Original Filed Oct. 4, 1944 6 Sheets-Sheet 4
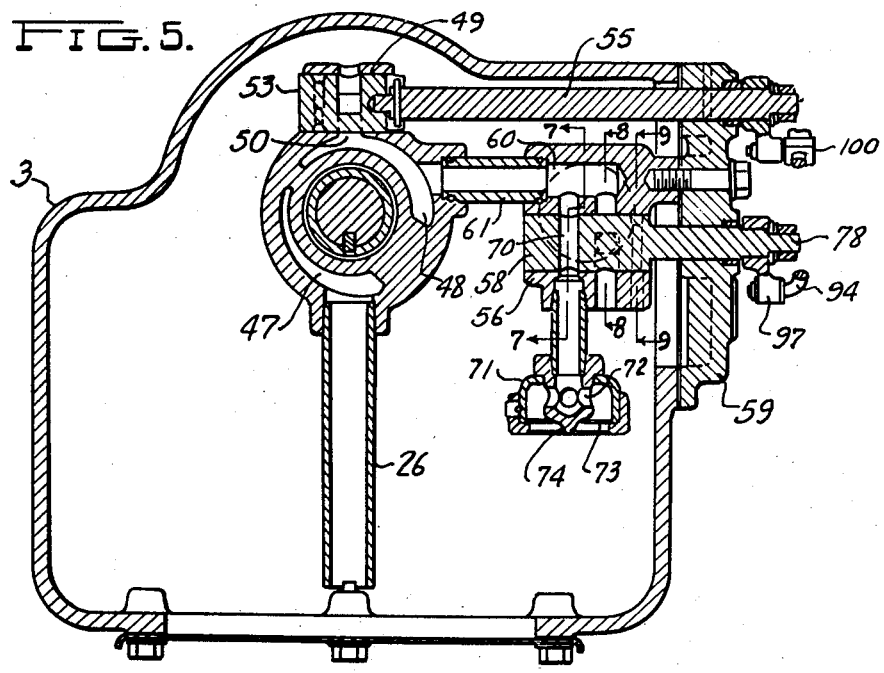
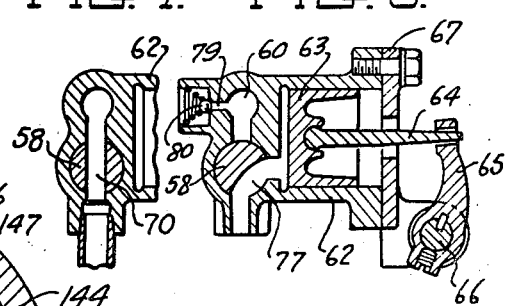
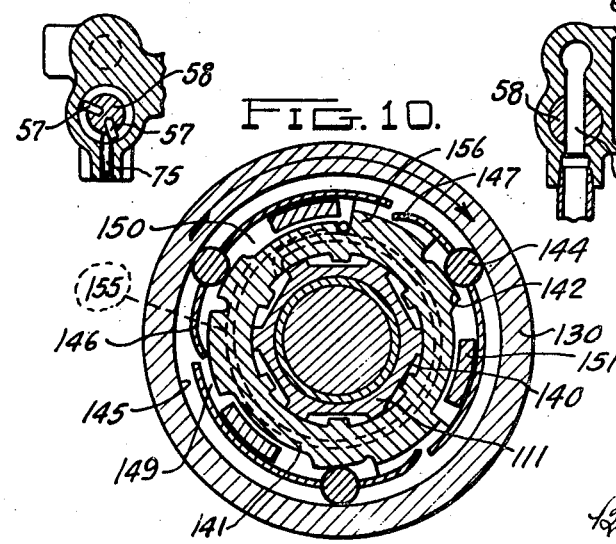
INVENTOR.
Ernest E. Wemp
BY
Barnes Kisselle Laughlin & Raisch
Attorneys Feb. 13, 1951 E. E. WEMP 2,541,452
TRANSMISSION OF POWER
Original Filed Oct. 4, 1944 6 Sheets-Sheet 5
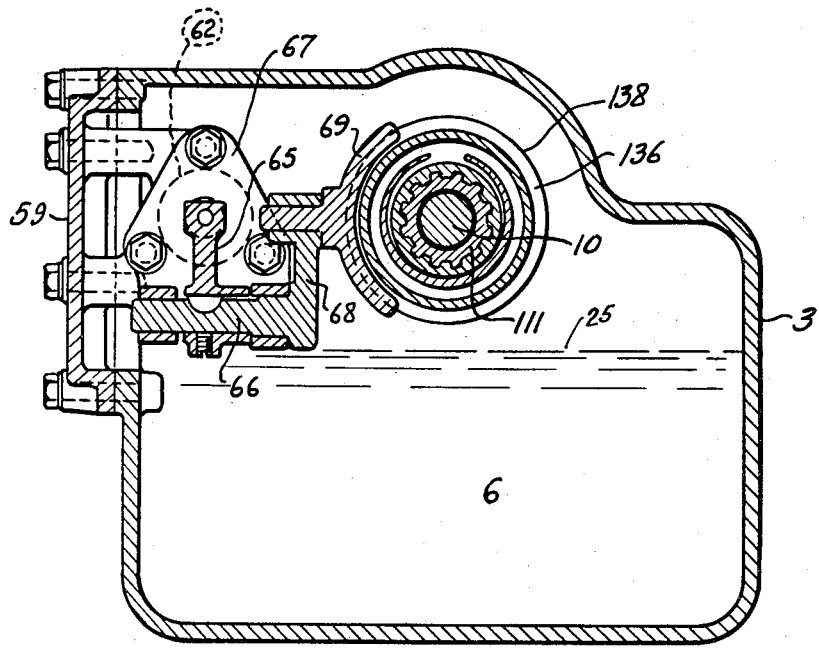
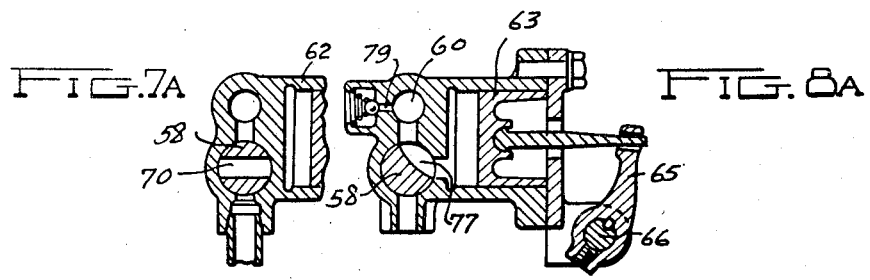
INVENTOR.
Ernest E. Wemp
BY Feb. 13, 1951 E. E. WEMP 2,541,452
TRANSMISSION OF POWER
Original Filed Oct. 4, 1944 6 Sheets-Sheet 6
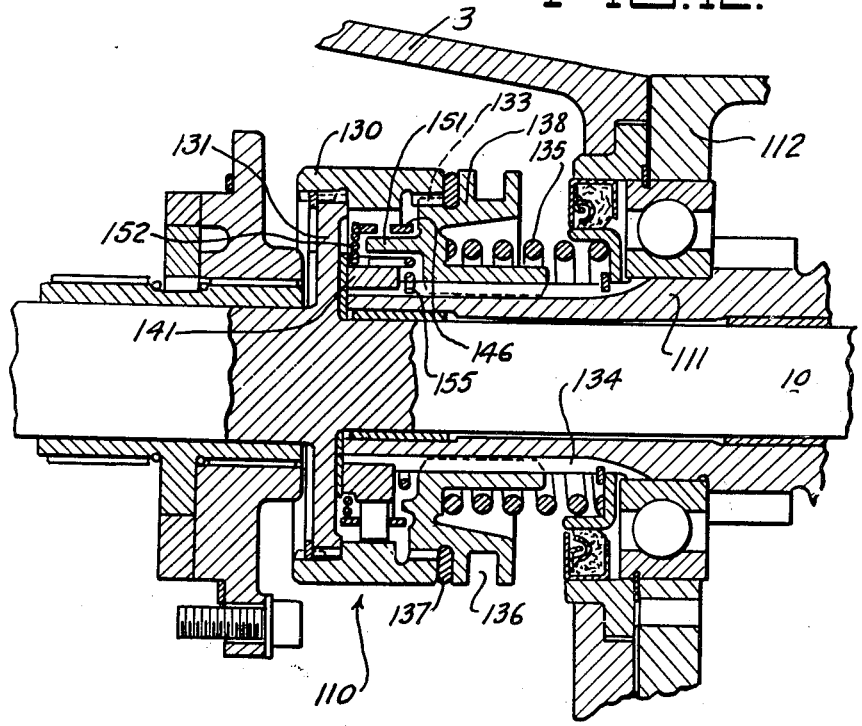
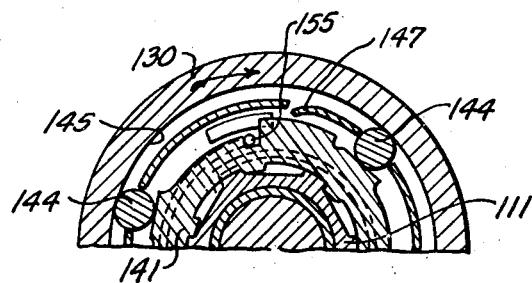
INVENTOR.
Ernest E. Wemp Patented Feb. 13, 1951

2,541,452

UNITED STATES PATENT OFFICE 2,541,452

TRANSMISSION OF POWER

Ernest E. Wemp, Detroit, Mich.

Continuation of application Serial No. 557,102, October 4, 1944. This application May 14, 1947, Serial No. 747,999

25 Claims. (Cl. 192—3.5)

This invention relates to the transmission of power and it has to do particularly with a construction and combination of elements particularly adaptable for use in automotive vehicles. This application is a continuation of application Serial No. 557,102, filed October 4, 1944, now abandoned.

The general and overall objects of the invention are to provide power transmitting means which will materially reduce the effort required and minimize the operations required in the changing of the gear ratios betwen the engine and the traction wheels in an automotive vehicle. To this end the invention contemplates a construction which may be employed with a conventional manually controlled gear shift transmission. The gear shift transmission, however, may be of an automatic or semi-automatic arrangement but the one selected for illustration herein is of the conventional manually controlled type. While the invention is applicable to automotive vehicles the power transmitting apparatus herein may be employed in other places where similar situations exist.

It is, of course, well known that in order to change the gears in a transmission from one ratio to another, that the torque line or, in other words, the transmission of power should be disrupted or discontinued. This is ordinarily done by releasing a friction clutch. In accordance with the present invention, the disrupting or breaking of the torque line is accomplished automatically by means other than a friction clutch. Briefly, the invention employs an automatic clutch, such as a centrifugal friction clutch, arranged to be disengaged at normal engine idling speeds and which becomes engaged as the engine R. P. M. is increased. The clutch is arranged to remain engaged during all periods of normal operation above engine idling R. P. M. The means for breaking the torque line takes the form of what may be termed a power coupling together with suitable control means therefor arranged in series relationship with the friction clutch. The control means for the power coupling is preferably hydraulic and governed by the accelerator treadle or throttle so that any time the engine throttle moves to engine idling position, the power coupling is opened to thus break the torque transmission line to facilitate changing of gears or for other purposes. Another object of the invention is to provide a hydraulic system which operates normally at low pressure but which changes instantly to high pressure when certain operations are desired in order to effect quick action of such operations. This is preferably controlled by the accelerator or throttle treadle.

The power coupling is one which will establish a dental engagement between driving and driven members substantially when the members become synchronized. Both the driving member and the driven member of the power coupling may be power operated at the time the coupling is made as distinguished from a situation where one of the coupling members is idling freely. The power coupling is of the type shown in my application Serial No. 291,574, filed August 23, 1939, now Patent No. 2,371,564, dated March 13, 1945 and the coupling shown herein is one which is normally locked in disengaged condition. During the operation of the mechanism the coupling is established when the driving member tends to exceed the R. P. M. of the driven member. When the vehicle is at rest and the engine is not operating, both the centrifugal clutch and the power coupling are open. Under these conditions, the engine cannot be turned over or started by the towing or pushing of the vehicle. To meet this situation, the invention provides a novel arrangement for transmitting power from the rear wheels of the vehicle to set the hydraulic mechanism into operation. The hydraulic system includes means effective upon the clutch to cause its engagement and thus when the clutch becomes engaged, the torque is transmitted from the traction wheels of the vehicle to the engine. In the normal operation of the mechanism the hydraulic means supplements the centrifugal force in engaging the clutch and, accordingly, a clutch having relatively light centrifugal weights may be employed. The use of a clutch thus lightly weighted facilitates smoothness of clutch engagement.

Other objects of the invention will become apparent as the following detailed description is considered in conjunction with the accompanying drawings:

Fig. 1 is a view largely in section showing a mechanism constructed in accordance with the invention including a centrifugal clutch, a hydraulic clutch supplementing means and a power coupling.

Fig. 2 is an enlarged cross sectional view of the power coupling in disengaged condition.

Fig. 3 is a cross sectional view taken substantially on line 3—3 of Fig. 1 showing a one-way coupling arrangement for the transmission of power from the traction wheels.

Fig. 4 is a view in side elevation showing the engine throttle and other control mechanism.

Fig. 5 is a cross sectional view taken substantially on line 5—5 of Fig. 1 showing some of the pump mechanism and some of the hydraulic system.

Fig. 6 is a sectional view taken substantially on line 6—6 of Fig. 1 showing some of the control mechanism.

Fig. 7 is a detailed view taken substantially on line 7—7 of Fig. 5 showing one of the control valves.

Fig. 8 is a sectional view taken substantially on line 8—8 of Fig. 5 showing another control valve and the control means for the power coupling.

Fig. 7a is a sectional view similar to Fig. 7 showing the control valve in a different position.

Fig. 8a is a sectional view similar to Fig. 8 showing that control valve in a different position.

Fig. 9 is a sectional view taken substantially on line 9—9 of Fig. 5 illustrating limit stops for one of the control valves.

Fig. 10 is a sectional view taken substantially on line 10—10 of Fig. 2 showing some of the mechanism of the power coupling and illustrating the same in coupled condition.

Fig. 11 is a view similar to Fig. 10 showing the parts with the power coupling locked in disengaged position.

Fig. 12 is a view similar to Fig. 2 showing the power coupling engaged.

Fig. 13 is a sectional view showing the control lever arrangement illustrated in Fig. 4.

The structure shown in Fig. 1 is exemplary of a mechanism for an automotive vehicle and includes the crank shaft 1 of the engine with its fly wheel 2 located in a housing 3. The housing is divided by a partition 4 to provide a dry chamber 5 for the clutch and a sump chamber 6 for the liquid of the hydraulic system.

In the clutch compartment 5 is an automatic clutch. The automatic clutch shown is one of the centrifugal type in that it is operated by centrifugal forces, and it also has a hydraulically controlled operation. The clutch includes a cover plate 7 attached to the fly wheel and a pressure plate 8 mounted for axial shift. A driven disc 9 is provided with facings to be frictionally engaged between the pressure plate and the fly wheel and it is suitably mounted on a clutch shaft 10. This clutch shaft is piloted in the fly wheel at its forward end as shown at 13, and it extends through the mechanism with its rear end being indicated at 14 for purposes which will presently appear. The pressure plate has a slidable and driving connection with the cover plate by means of lugs 15. Mounted on the cover plate are levers 16 formed to provide an unbalanced centrifugal mass 17 and inwardly extending arms 18. A strut extends through the cover plate as shown at 19 and provides a compression connection between the lever and the pressure plate. The levers are provided with suitable tips 20 and the pressure plate is normally held retracted by a suitable number of retractor springs 21 each acting on a stud 22 which extends through the cover plate and is attached to the pressure plate.

This particular clutch is disclosed in detail and claimed in my Patent No. 2,395,308 of February 19, 1946. Suffice it to say herein that at normal engine idling speeds and while the parts are at rest, retractor springs 21 hold the clutch disengaged. There are a number of retractor springs circumferentially arranged around the cover plate. Also, there are a suitable number of levers 16. The engine idling speed may be about 500 or 600 R. P. M. and when the speed of rotation increases to about 700 or 800 R. P. M. the unbalanced centrifugal mass 17 causes the lever 16 to swing about its fulcrum and push the pressure plate to the left as Fig. 1 is viewed through the compression strut 19 to cause the driven disc to be frictionally packed between the pressure plate and the fly wheel. The centrifugal force of the clutch is relatively light and is preferably such that the clutch does not have sufficient torque capacity, at speeds below about 1800 to 2000 R. P. M. to transmit maximum engine torque. However, the clutch packing pressure is supplemented hydraulically as will presently be seen.

The chamber 6 is provided with a suitable hydraulic medium such as an oil up to a normal level which may be about as indicated by the line 25 and mounted so as to be driven by the clutch shaft 10 is a pump provided with an inlet tube 26. The pump body 27 and a cylinder 28 are mounted around the shaft 10 in the partition 4 by suitable cap screws 29. Disposed in the cylinder is a piston 30 which operates on a sleeve 31 through which the shaft 10 freely extends. The piston itself has a sleeve formation 32 and the piston is sealed preferably by O-type sealing rings, as shown at 33 and 35. The forward end of the cylinder is closed by a ring 36, screw threaded into the cylinder and the sleeve 32 of the piston extends through this ring. Mounted on the end of the sleeve is an anti-friction bearing 37. This bearing is arranged to contact the lever tips. The ring 36 limits the movements of the piston by contacting the anti-friction bearing and a shoulder 38 on the sleeve 32. A spring 39 is positioned in the cylinder between the ring 36 and the piston head. It will be seen and readily appreciated that movement of the piston to the left, as Fig. 1 is viewed, will cause movement of the clutch lever 16 in a direction which is the same as the direction of the movement of the lever caused by centrifugal force. Accordingly, the clutch packing pressure may be obtained in part by centrifugal force and in part by pressure applied to the lever by the piston.

As the facings wear in use the lever tips will swing a greater distance toward the fly wheel and an adjustment is provided for changing the path of movement of the piston. This adjustment resides in the ring 36 which can be engaged by a suitable tool at its notched periphery 40, with the tool being entered through the opening 42 in the housing, and turned on its screw threads. As the ring 36 is backed away on its screw threads the forward limit of the piston is advanced toward the clutch. The ring may be held in adjusted position by a spring-pressed detent 41.

The pump is of a well known gear type having an inner member 45 keyed to and driven by the shaft 10 and an outer cooperating member 46, while the pump housing has an inlet chamber 47 and an outlet chamber 48. The pump housing is provided with a valve chamber 49 having a port 50 (Fig. 5) opening into the high pressure chamber 48, a port 51 opening into the sump chamber and a port 52 opening into the cylinder. In this valve chamber is a rotary valve 53 ported as at 54. In the position shown in Fig. 1, the port 54 exhausts the cylinder to the sump. If the valve 53 is rocked approximately 90° counter-clockwise, as Fig. 1 is viewed, the port 54 connects the outlet or high pressure chamber 48 of the pump with the cylinder. The valve 53 has a control shaft 55 (Fig. 5) extending out through the side of the housing.

There is a body member 56 mounted inside the sump chamber as by means as being mounted on a supporting closure cap 59 and this body member has a high pressure passage 60 connected to the outlet chamber 48 of the pump by a suitable connection 61. This body member, as shown in Fig. 8, has a cylinder formation 62 in which is disposed a piston 63 associated through a thrust rod 64 with a lever 65 in turn keyed to a shaft 66 journalled in a bracket formation 67 which is fastened into the body. As shown in Fig. 6, the shaft 66 has an arm 68 connected to a yoke-like block 69 for purposes which will presently appear.

A valve 58 is mounted in the body and has a port 70 therein arranged to connect to a pressure control device generally shown at 71. Considering Fig. 5, liquid under pressure entering the pressure control device through ports 72 may escape therefrom and into the sump by the flexing of a spring-like washer member 73 which is seated and gripped at its outer peripheral edge and which may yieldingly engage a seat 74 at its inner peripheral edge. The inner peripheral edge of the washer-like member may have initial clearance with reference to the seat. This particular control device is covered in application No. 538,409, filed June 2, 1944, now abandoned.

The control valve 58 also has a port 77. A control shaft for the valve 58 extends out through the cap 59 as shown at 78. When the control valve is in the position shown in Figs. 7 and 8, the pumped liquid is blocked off from the cylinder 62 and flows freely into the pressure regulator. When the control valve 58 is in the position shown in Figs. 7a and 8a the passage to the pressure regulator is closed and the pumped liquid flows into the cylinder 62. There is another high pressure relief device as shown in Figs. 8 and 8a, which may take the form of a relief port 79 closed by a spring-pressed ball 80. The valve 58 is limited in its movement by stop pins 57 functioning on an abutment or stop screw 75 (Fig. 9).

Accordingly, it will be observed that as long as the shaft 10 is operating the pump is functioning. When the valve 53 is in exhaust position, as shown in Fig. 1, it closes off the pump high pressure chamber 48. When the valve 58 is in the position shown in Figs. 7 and 8 the high pressure pump chamber is closed off from the cylinder 62 and the pumped liquid exhausts through the pressure regulator 71. When the valve 58 is in the position shown in Figs. 7a and 8a, the passage to the pressure regulator 71 is closed and the liquid is pumped into the control cylinder 62. Under certain operating conditions the valve 53 will be in the position shown in Fig. 1 and the valve 58 will be in the position shown in Figs. 7a and 8a and, therefore, the high side of the hydraulic system is, in effect, a closed system. The piston 63 may have a somewhat loose fit in its cylinder so as to provide some leakage. This may determine the pressure attained when the system is closed, but, in any event, the high pressure relief valve 80 takes care of extreme situations.

Considering now the control of the vehicle and the control of the valves, reference may be had to Fig. 4. The foot treadle or throttle for the vehicle is shown at 83 for rocking a shaft 84. A lever arm 85 operates the fuel control or carburetor, diagrammatically illustrated at 86, having an operating arm 87 connected to the arm 85, through link 88 and a lost motion connection which may take the form of a pin and slot 89. With this arrangement, the treadle may be shifted substantially from the full line position, as shown in Fig. 4, to the dotted line position before there is any operation of the carburetor arm 87. Thus, there is a lash or lost play movement of the treadle. It will be understood that when the treadle is retracted, as by means of the retractor spring 90, that the fuel supply is substantially closed and the throttle is positioned for engine idling condition. There is another arm 92 mounted on the rock shaft 84 and connected thereto by a torsion spring 91 (Fig. 13). This arm 92 is connected to a link 94 as at 93. The rod 94 connects to an arm 97 which is mounted on the control shaft 78. There is another arm 98 mounted on the shaft 78 provided with a link 99 with a slidable connection at 100 to an arm 101 on shaft 55. There is a spring 102 which provides a yieldable compression connection between the arm 98 and the arm 101. Nuts 103 on the link 99 engage the arm 100 on the side opposite the spring 102. Projecting from the rock shaft 55 is a finger 104 arranged to contact an adjustable stop 105. The arms 97 and 98 may be integral and the arm 101 may be integral with the finger 104.

The torque from the engine is transmitted through the clutch shaft 10 and through the power coupler generally shown at 110 to a member 111. This member, insofar as the power coupling is concerned, is a driven member, but, insofar as the vehicle is concerned, is a driving member. The member 111 extends into an ordinary or conventional gear shift transmission 112 wherein the gear shift is made by a suitable hand controlled rod or the like 113, the member 111 being provided with gear teeth 114. Details of the transmission are not shown as it is well known to those versed in the art. Suffice it to say that a driving member 115 extends out through the back of the transmission. The member 115 is a sleeve in which the rear end 14 of the clutch shaft 10 is journalled as by means of roller bearings 116. Mounted on the member 115, as by means of splines, is a member 117 adapted for connection to the final propeller shaft of the vehicle. This member constitutes one part of a one-way drive coupling between the propeller shaft and the clutch shaft 10. The other member of the one-way drive coupling is shown at 118 and it is splined or keyed to the clutch shaft 10 (Fig. 3). The member 117 has a plurality of notches 120 for receiving rollers 121 and the member 118 has recesses, each provided with a relatively abrupt surface 122 and a cam-like surface 123.

Considering that the parts rotate counterclockwise as Fig. 3 is viewed; so long as the member 117 is rotating at a reasonable R. P. M., say about engine idling speed, rollers 121 are held outwardly in the notches 120 by centrifugal force and are ineffective. Also, it will be noted that the clutch shaft 10 cannot drive the member 117 in the direction indicated. However, when the parts come to rest the upper roller gravitates into the position shown in Fig. 3 and then if the part 117 is caused to begin rotation in a direction of the arrow, the upper roller is gripped in the cooperating notches and the shaft 10 is caused to rotate.

The power coupling has a driving member 130 connected to a flange 131 on the clutch shaft. This driving member has teeth 132 for dental engagement with teeth 133 of a coupler 138 which is mounted on the driven sleeve 111 through the means of helical splines 134. This coupler is acted upon by a spring 135, has a groove 136 for receiving the yoke 69 and it may advantageously have a bumper of rubber or the like 137 for contacting the driving member 130.

Loosely splined on the end of the driven member 111 (Fig. 10) as by means of the splines 140, is a blocker ring 141 which constitutes a part of a one-way or overrunning coupling provided by inclined surfaces 142 on the blocker ring which cooperates with rollers 144 arranged to engage the internal surface 145 of the driving member 130. These rollers are held in a cage 146 and the cage is held against axial displacement by metal parts 147 which are bent into a central groove 149 in the blocker ring.

The blocker ring has notches or cut-away portions 150 designed to receive blocker teeth 151 on the coupler 138. A relatively light torsion spring 152 has one end engaged with the cage 146 and the other end engaged with the blocker ring 141. This spring keeps the cage urged in a clockwise direction as Fig. 10 is viewed so as to maintain the rollers 144 in contact with the surface 142 and the inner peripheral surface 145. There is another torsion spring 155 with one end engaged with the splines on the driven member 111 and the other end engaged with the blocker ring, as shown in Fig. 2. This spring normally tensions the blocker ring in a counter-clockwise direction as Fig. 10 is viewed. If the parts are otherwise unrestrained the torsion spring 155 shifts the blocker ring to the position shown in Fig. 11, wherein the blocking abutments 156 on the blocker ring project in front of the blocking teeth 151 on the coupler. In this position the coupler member 138 is held locked in disengaged condition as shown in Fig. 2. This condition will remain indefinitely and is released by a tendency of the driving member to rotate faster or at a higher R. P. M. than the driven member.

Considering that the parts are in the relative position shown in Fig. 11, with the coupler locked in disengaged condition; the driving member 139 may be rotating at a lower R. P. M. than the driven member or it may be at rest. Upon acceleration of the engine and, therefore, the driving member 130, it may come up to the R. P. M. of the driven member. The driving member and the driven member are thereupon synchronized. As soon as the driving member tends to exceed the R. P. M. of the driven member in a clockwise direction as indicated in Fig. 10, the overrunning clutch will take hold and rock the blocking ring 141 clockwise relative to the driven member as Fig. 11 is viewed. This is permitted by reason of the spring 155. Only a slight movement of the ring is needed to shift the blocking elements 156 out of blocking position or, in other words, substantially to the position shown in Fig. 10, whereupon the spring 135 pushes the coupler to the left, as Fig. 2 is viewed causing a dental engagement of the teeth 132 and 133 and thereby establishing a driving connection.

It will be seen, therefore, that in an automotive vehicle, for example, the driving member may be power operated by the engine and the driven member may be power operated by the movement of the vehicle and yet a dental coupling may be made without clash of the teeth. There is, of course, a time period which occurs between the point where the teeth 133 and 132 start their dental engagement and the point where the dental engagement is complete. The helical splines 134 take care of this situation. In this short time interval the coupler 138 overruns or turns faster than the driven member 111 as it shifts axially on the helical splines and, accordingly, no torque is transmitted until the bumper 137 comes up against the driving member 130 and stops the axial shifting of the coupler 138. The angle of the helical splines 134, which are left hand splines, tends to cause the coupler 138 to shift toward the driving member 130 when torque is delivered from the driving member to the driven member. In other words, under these conditions, the dental engagement is accepting. Upon torque reversal, that is, when torque is delivered from the driven member to the driving member, the angle tends to cause a rejection of the coupler but this is normally prevented because of the frictional load on the dentally engaged teeth, the frictional load on the splines themselves, and the spring 135.

Considering now the general operation of the construction: If the engine and the vehicle are both at rest the parts may be in the relative positions as shown in Fig. 1, with the centrifugal clutch disengaged and with the power coupling disengaged. The engine may be started in the usual manner, but this does not change the position of the parts inasmuch as the engine may be operating only at idling R. P. M. with the centrifugal clutch remaining disengaged. To put the vehicle in motion the operator may shift the transmission into low gear and thereupon the accelerator treadle may be depressed. In the lash movement of the treadle, that is, the movement of the treadle without actuation of the fuel control, as permitted by the pin and slot connection 89, during which time the connection 93 may move to about the point marked $x$, the valve 58 is moved from the position shown in Figs. 7a and 8a to the position shown in Figs. 7 and 8, and the valve 53 is moved to position to connect the pump to the cylinder 28, as shown by the dotted lines of Fig. 1. The exact location of valve 53 may be regulated by the stop 55 and any differential movement of the valves 53 and 58 is taken up by the spring 102. Following the lash movement the fuel supply means is shifted and the engine R. P. M. increases to thus cause engagement of the centrifugal clutch. The control valves having moved to the limit, the operation of the carburetor is effected by the rocking of the shaft 84 and the flexing of the spring 91. The fact that the centrifugal clutch is of light construction promotes smoothness in the starting action. Engagement of the clutch rotates the clutch shaft 10 which, as mentioned above, is ineffective on the drive member 117 but it turns the driving member 130 of the power coupling thus causing an immediate dental engagement of the teeth 132 and 133 so that torque is transmitted through the transmission to member 117 and from there to the traction wheels. At the same time the clutch shaft 10 begins to operate the pump and liquid under pressure is pumped into the cylinder 28 causing shift of the piston 30 which moves to the left and supplements the clutch packing pressure. Also, the pumped liquid flows into the high pressure line 60 and from there through port 70 into the low pressure regulator 71.

When a change of gears is to be made in a transmission as, for example, from low gear to a higher gear, which may be second gear, the treadle is released so that it retracts to the position shown in Fig. 4. This shifts the valve 58 to the position shown in Figs. 7a and 8a, and thus closes off the line to the low pressure regulator and opens the high pressure line to the control cylinder 62. The liquid under pressure urges the piston 63 to the right as Fig. 8a is viewed, and shifts the coupler through the means of the yoke to disengaged position, as shown in Fig. 2. The breaking of the coupling occurs preferably, substantially upon torque reversal; i. e. when the driven member starts to drive the driving member. The engine may not necessarily decelerate to a point where the friction clutch becomes disengaged. However, it does decelerate to an R. P. M. below that of the driven member 111 and, therefore, the coupler becomes locked out as shown in Fig. 11. After the gear shift has been made the treadle is again depressed, the valve 58 shifts back to the position shown in Figs. 7 and 8 and the liquid in the cylinder 62 is dumped into the sump. This action, however, does not cause a coupling at the power coupler since the R. P. M. of the engine must increase to that of the driven member 111 and then tend to overrun the same in order to cause the overrunning rollers 144 to grip the blocker ring 141 and shift it from its blocking position, as shown in Fig. 11, to its unblocking position as shown in Fig. 10, whereupon, and when the driving member and the coupler are substantially synchronized, there is a dental engagement between the teeth 132 and 133.

If it is desired, to cause the engine to serve as a brake or decelerating agency for the vehicle, the treadle may be retracted to a position at about the commencement of its lash movement, so as to cut the engine throttle to idling condition without, however, disturbing the control valves. This keeps the power coupling connected. The operation of a vehicle equipped with this invention at a traffic light or in any other situation where a stop is to be made, is greatly simplified. The vehicle may be brought to a stop without any operating movements whatever except for the application of the brake. When the engine reaches about engine idling R. P. M. the centrifugal clutch disengages. This stops operation of the clutch shaft and causes cessation of operation of the pump. The power coupling may remain engaged. The operator need only shift into a lower gear, if he desires, and step on the treadle for a get away. On the other hand, the treadle may be released entirely as the vehicle approaches a stop which causes disengagement of the power coupling and ultimately the centrifugal clutch will become disengaged. Then, upon depression of the treadle the centrifugal clutch starts to engage and turns the clutch shaft 10 and a coupling is made at the power coupler as the driving member 130 starts to turn relative to the driven member which is standing at rest.

During all normal operations the hydraulic system is operating under relatively low pressure, as determined by the low pressure regulator. However, pressure quickly jumps up when the valve 58 is manipulated to thus provide a quick and adequate pressure for releasing the power coupler. The piston 30 places an end thrust on the crank shaft of the engine, but when the R. P. M. exceeds about 2000 the compressibility of the driven disc and the inherent flexing in the cover plate and other parts cause the lever tips to shift away from the bearing 37 so that this end thrust is not present during normal operations above about 1800 or 2000 R. P. M.

When the vehicle is parked or placed in a garage and the engine stopped, the centrifugal clutch remains open and, in all probability, the power coupling will open. Now, it frequently happens, especially in winter, that it is necessary to tow or push the vehicle to start the engine by the transmission of power from the traction wheels. This, of course, is impossible, as long as the friction clutch remains open. This is where the one-way coupling between the rear end of the clutch shaft and the member 117 comes into use. With the shaft 10 standing at rest, towing or pushing of the vehicle causes the member 117 to rotate counter-clockwise as Fig. 3 is viewed. One of the rollers 121 will gravitate into a position so that it is engaged compressively in the cooperating notches, this being the condition of the upper roller as Fig. 3 is viewed. The clutch shaft then is rotated and it starts to operate the pump. Upon depression of the treadle, the valve 53 is shifted so that the pumped liquid is transmitted into the cylinder 28 and the piston 30 is shifted to cause engagement of the clutch. As soon, however, as the engine begins to operate faster than the rotation of the member 117, the driving roller 121 is released and if the member 117 is rotating fast enough the rollers will be held centrifugally outwardly in their pockets. The one-way coupling comprising the rollers 121 is essentially a low speed type of coupling and is ineffective at relatively low R. P. M.'s of the member 117. The member 117 may operate reversely without the transmission of torque to the clutch shaft 10.

I claim:

1. A mechanism for transmitting power from the engine to the traction wheels of an automotive vehicle or the like, comprising in combination, a centrifugal clutch normally open at engine idling speeds and while at rest, a transmission operable to effect various driving ratios between the engine and the traction wheels and having a power input member and a power output member for connection to the traction wheels, a clutch shaft operated by the centrifugal clutch and extending freely through the transmission and having one end adjacent the power output member, a coupling between the clutch shaft and the power input member capable of transmitting torque in both directions and operable to establish and disestablish the connection, means operated by the clutch shaft for causing engagement of the clutch in the absence of centrifugal force, and a one-way drive coupling for transmitting torque from the said power output member to the clutch shaft effective to establish a coupling when the vehicle is pushed or towed.

2. A mechanism for transmitting power from the engine to the traction wheels of an automotive vehicle or the like, comprising in combination, a centrifugal clutch normally open at engine idling speeds and while at rest, a transmission operable to change the driving ratios between the engine and the traction wheels and having a power input member and a power output member, a clutch shaft operated by the centrifugal clutch, a coupling between the clutch shaft and the power input member for transmitting torque to the transmission and operable to establish and disestablish a connection between the clutch shaft and the input member, means operated by the clutch shaft for causing engagement of the clutch independently of centrifugal force and a one-way drive coupling for transmitting torque from said power output member to the clutch shaft.

3. A mechanism for transmitting power from the engine to the traction wheels of an automotive vehicle or the like, comprising in combination, a centrifugal clutch having a driving member rotatable with the engine and having a driven member, said clutch being normally disengaged at engine idling speeds and while at rest, a clutch shaft operated by the driven member, a transmission operable to vary the driving ratios between the engine and the traction wheels and having a power input member and a power output member, a coupling between the clutch shaft and the power input member of the transmission of the type for transmitting torque in both directions and operable to establish and disestablish a connection between the clutch shaft and the input member, means operable by the clutch shaft for causing engagement of the centrifugal clutch in the absence of centrifugal force, and a one-way drive coupling for transmitting torque from said power output member to the clutch shaft and which is effective to establish a coupling upon the pushing or towing of the vehicle to start the engine.

4. In a mechanism for transmitting power from the engine to the traction wheels of an automotive vehicle or the like, comprising in combination, a centrifugal clutch having driving members and centrifugal operating means mounted to rotate with the engine and having a driven member, the clutch being normally disengaged at engine idling speeds and while at rest, a transmission positioned to the rear of the centrifugal clutch and having a power input member and a power output member, the transmission being arranged to change the driving ratios between the engine and the traction wheels and the output member being adapted to be connected to the traction wheels, a clutch shaft operated by the clutch driven member and extending through the transmission in non-driving relationship, a coupling between the clutch shaft and the power input member and operable to establish and disestablish a two way driving connection between the clutch shaft and the power input member, said coupling being located between the clutch and the transmission, means positioned between the clutch and the transmission and operated by the clutch shaft for acting upon the clutch to cause engagement thereof when the engine is at rest and a one-way drive coupling effective for transmitting torque from the power output member to the clutch shaft when the vehicle is pushed or towed whereby the engine may be started by movement of the vehicle.

5. A mechanism for transmitting power from the engine to the traction wheels of an automotive vehicle or the like, comprisnig in combination, a centrifugal clutch normally open at engine idling speeds and while at rest, a transmission for varying the driving ratio between the engine and the traction wheels and having a power input member and a power output member, a clutch shaft operated by the centrifugal clutch, a coupling between the clutch shaft and the power input member for transmitting engine torque to the transmission and operable to establish and disestablish a two way driving connection, a hydraulic system including a pump, a cylinder with a piston therein shiftable to apply engaging pressure on the clutch, a control valve for governing the introduction of a pumped liquid into the cylinder and means connecting the pump to the clutch shaft for operating the pump from torque delivered by the engine through the clutch shaft and from torque delivered by the traction wheels of the vehicle whereby when the engine is operating the centrifugal engaging pressure of the clutch is supplemented and whereby the clutch may be engaged independently of centrifugal force to start the engine by movement of the vehicle.

6. A mechanism for transmitting power from the engine to the traction wheels of an automotive vehicle or the like, comprising in combination, a centrifugal clutch normally open at engine idling speeds and while at rest, a transmission for varying the driving ratio between the engine and the traction wheels and having a power input member and a power output member, a clutch shaft operated by the centrifugal clutch, a coupling having parts with dentally engaging teeth between the clutch shaft and the power input member for transmitting torque in both directions, a hydraulic system including a pump, a cylinder with a piston therein operable upon the clutch to apply engagement pressure, another cylinder with a piston therein operable upon the said coupling, connections between the pump and the cylinders, control valve means between the pump and the cylinders, said pump being operable from the engine and from the traction wheels of the vehicle whereby the clutch packing pressure is hydraulically supplemented during engine operation and the clutch hydraulically engaged by movement of the vehicle when the engine is at rest.

7. A mechanism for transmitting power from the engine to the traction wheels of an automotive vehicle or the like, comprising in combination, a centrifugal clutch normally open at engine idling speeds and while at rest, a transmission for varying the driving ratio between the engine and the traction wheels and having a power input member and a power output member, a clutch shaft operated by the centrifugal clutch, a coupling having members with dentally engaging teeth between the clutch shaft and the power input member for transmitting torque in both directions, a hydraulic system including a pump, a cylinder with a piston therein operable upon the clutch to apply engagement pressure, another cylinder with a piston therein operable upon the said coupling, connections between the pump and the cylinders, control valve means between the pump and the cylinders and arranged to connect one cylinder with the pump while the other one is disconnected from the pump and vice versa, said pump being operable from the engine and from the traction wheels of the vehicle for driving the pump whereby the clutch packing pressure is hydraulically supplemented during engine operation and the clutch hydraulically engaged by movement of the vehicle when the engine is at rest.

8. A mechanism for transmitting power from the engine to the traction wheels of an automotive vehicle or the like, comprising in combination, a centrifugal clutch normally open at engine idling speeds and while at rest, a transmission for varying the driving ratio between the engine and the traction wheels and having a power input member and a power output member, a clutch shaft operated by the centrifugal clutch, a power coupling between the clutch shaft and the power input member for transmitting torque in both directions, said coupling including relatively slidable dentally engaging members, and arranged to engage upon substantial synchronization as the clutch shaft tends to exceed the speed of rotation of the power input member, a hydraulic system including a pump, a first cylinder with a piston therein operable upon the clutch to apply engaging pressure, a second cylinder with a piston therein operable to disengage the power coupling, connections between the pump and the two cylinders, throttle control means for the engine, control valves operated by the throttle control means arranged to connect the pump to the first cylinder and to disconnect the pump from the second cylinder when the throttle control means is actuated to increase the speed of the engine and to disconnect the pump from the first cylinder and to connect the pump to the second when the throttle control means shifts substantially to engine idling position, said pump being operable by the engine when it is rotating and by the traction wheels when the engine is at rest for operating the pump whereby the clutch may be engaged independently of centrifugal force and the engine started by movement of the vehicle.

9. A mechanism for transmitting power from the engine to the traction wheels of an automotive vehicle or the like, comprising in combination, a centrifugal clutch normally open at engine idling speeds and while at rest, a transmission for varying the driving ratio between the engine and the traction wheels and having a power input member and a power output member, a clutch shaft operated by the centrifugal clutch, a coupling for transmitting torque in both directions between the clutch shaft and the power input member including members arranged for dental engagement and disengagement and of the type which may be engaged when the dentally engaging parts are under power, a hydraulic system including a pump operated by the clutch shaft, a clutch controlling cylinder and piston operable to engage the clutch in the absence of centrifugal force, a coupling controlling cylinder and piston operable to disengage the coupling, the said two cylinders being connected to the pump, an accelerator treadle for the engine, control valves operable by the treadle to introduce pumped liquid into the clutch controlling cylinder when the treadle is actuated for engine acceleration and operable to introduce pumped liquid into the coupling controlling cylinder when the treadle is shifted substantially to engine idling position for disengagement of the coupling, whereby gears may be shifted in the transmission, and means for driving the clutch shaft upon movement of the vehicle and when the engine is at rest, whereby to operate the pump and engage the clutch and start the engine by movement of the vehicle.

10. A mechanism for transmitting power from the engine to the traction wheels of an automotive vehicle or the like, comprising in combination, a centrifugal clutch operated by the engine and which is normally open at engine idling speeds and while at rest, a transmission for effecting different ratios between engine and traction wheels and having a power input member and a power output member for connection to the traction wheels, a clutch shaft operated by the centrifugal clutch, a coupling having members with dentally engaging teeth between the clutch shaft and the power input member for transmitting engine torque in both directions, means operated by the clutch shaft for causing engagement of the clutch in the absence of centrifugal force and for causing disengagement of the coupling, operator controlled means for governing the effectiveness of the last named means on the clutch and coupling and a one-way drive coupling for transmitting torque from said power output member to the clutch shaft when the vehicle is pushed or towed, whereby the engine may be started by movement of the vehicle.

11. A mechanism for transmitting power from the engine to the traction wheels of an automotive vehicle or the like, comprising in combination, a centrifugal clutch operated by the engine and having a torque capacity insufficient to transmit maximum engine torque up to about 1800 to 2000 R. P. M., a cylinder, a piston in the cylinder acting upon the clutch to supplement the centrifugal packing pressure and to engage the clutch independent of centrifugal force, a clutch shaft, a transmission for changing the driving ratio between the engine and the traction wheels, said transmission having a power input member and a power output member, a coupling between the clutch shaft and the power input member for transmitting torque in both directions, a cylinder with a piston therein operable to disengage the coupling, a hydraulic system including a pump operable by the clutch shaft with connections from the pump to the cylinders, an engine throttle control, control valves between the pump and the cylinders operably connected to the throttle control and means for driving the clutch shaft upon movement of the vehicle and while the engine is at rest, whereby to operate the pump to engage the clutch independently of centrifugal force and start the engine by movement of the vehicle.

12. A mechanism for transmitting power from the engine to the traction wheels of an automotive vehicle or the like, comprising in combination, a centrifugal clutch normally open at engine idling speeds and while at rest, a transmission operable to change the driving ratios between the engine and the traction wheels and having a power input member and a power output member, a clutch shaft operated by the centrifugal clutch, a coupling between the clutch shaft and the power input member for transmitting torque to the transmission and operable to establish and disestablish a connection between the clutch shaft and the input member, means operated by the clutch shaft for causing engagement of the clutch independently of centrifugal force.

13. A mechanism for transmitting power from the engine to the traction wheels of an automotive vehicle or the like, comprising in combination, a centrifugal clutch normally open at engine idling speeds and while at rest, a transmission operable to change the driving ratios between the engine and the traction wheels and having a power input member and a power output member, a clutch shaft operated by the centrifugal clutch, a coupling between the clutch shaft and the power input member constructed to transmit torque in both directions and operable to establish and disestablish a connection between the clutch shaft and the power input member, and means operated by the clutch shaft for causing engagement of the clutch independently of centrifugal force.

14. A mechanism for transmitting power from the engine to the traction wheels of an automotive vehicle or the like, comprising in combination, a centrifugal clutch having weighted and driving members operable with the engine and normally disengaged at engine idling speeds and while at rest and normally engaged at operating speeds, a transmission for connection to the vehicle traction wheels and operable to change the driving ratios between the engine and the traction wheels, a clutch shaft operated by the centrifugal clutch, a power coupling between the clutch shaft and the transmission adapted to transmit torque in both directions and operable to establish and disestablish a connection between the clutch shaft and the power input member, and means operated by the clutch shaft from torque transmitted from the traction wheels for engaging the clutch independently of centrifugal force whereby the engine may be started by movement of the vehicle.

15. A mechanism for transmitting power from the engine to the traction wheels of an automotive vehicle or the like, comprising in combination, a centrifugal clutch having driving members associated with the engine and operated centrifugally by engine operation, said clutch being normally disengaged at engine idling speeds and while at rest and normally engaged at operating speeds, a transmission connectable to the traction wheels and arranged to change the driving ratio between the engine and the traction wheels, said transmission having a power input member and a power output member, a clutch shaft operated by the centrifugal clutch, a coupling between the clutch shaft and the power input member of the type for transmitting torque in both directions, said coupling arranged to engage when the engine tends to drive the vehicle, means for disengaging the coupling upon torque reversal and means operable by the clutch shaft from torque transmitted from the traction wheels of the vehicle for causing engagement of the clutch independently of centrifugal force whereby the engine may be started by movement of the vehicle.

16. A mechanism for transmitting power from the engine to the traction wheels of an automotive vehicle or the like, comprising in combination, a centrifugal clutch operated by the engine and normally disengaged at engine idling speeds and while at rest and normally engaged at operating speeds, a transmission connectable to the traction wheels and operable to change the driving ratio between the engine and the traction wheels, a clutch driven member, a coupling between the clutch driven member and the transmission of the type for transmitting torque in both directions, said coupling adapted to establish a connection between the clutch driven member and the transmission when torque is delivered from the engine, means for disengaging the coupling when the torque is reversed so that the driving torque comes from the traction wheels, and means operated by torque delivered from the traction wheels to cause engagement of the clutch independently of centrifugal force whereby the engine may be started by movement of the vehicle.

17. A mechanism for transmitting power from the engine to the traction wheels of an automotive vehicle or the like, comprising in combination, a centrifugal clutch having driving members associated with the engine and operated centrifugally by engine operation, said clutch being normally disengaged at engine idling speeds and while at rest and normally engaged at operating speeds, a transmission connectable to the traction wheels and arranged to change the driving ratio between the engine and the traction wheels, said transmission having a power input member and a power output member, a clutch driven member, a coupling between the clutch driven member and the power input member of the type for transmitting torque in both directions, said coupling being operable to establish a connection between the clutch driven member and the power input member when the engine tends to drive the vehicle and when the clutch driven member and the power input member are substantially synchronized and both under load, means for disengaging the coupling upon torque reversal, and means operable by torque transmitted from the traction wheels of the vehicle for causing engagement of the clutch independently of centrifugal force whereby the engine may be started by movement of the vehicle.

18. A mechanism for transmitting power from the engine to the traction wheels of an automotive vehicle or the like, comprising in combination, a centrifugal clutch normally open at engine idling speeds and while at rest, a transmission for varying the driving ratio between the engine and the traction wheels, a coupling between the clutch and the transmission for transmitting torque in both directions, a hydraulic system including a pump, first and second cylinders with pistons therein operable respectively upon the clutch and coupling, an engine throttle member, control valves operated by the throttle member to introduce pumped liquid into the first cylinder and to cut off pumped liquid from the second cylinder as the throttle is actuated to cause torque to be delivered from the engine to supplement clutch packing pressure and for engagement of the coupling and operable to cut off pumped liquid from the first cylinder and to introduce pumped liquid in the second cylinder when the throttle member is actuated for engine idling speeds to relieve the clutch of supplemental pressure and to disengage the coupling, a low pressure relief valve, and control valve means for connecting the low pressure relief valve into the hydraulic system when the throttle member is actuated to cause the engine to deliver torque and for cutting the low pressure relief valve out of the system when the throttle member is actuated to engine idling speeds, whereby high pressure is effective when the throttle member moves to engine idling speeds.

19. A mechanism for transmitting power from the engine to the traction wheels of an automotive vehicle or the like, comprising in combination, a centrifugal clutch normally open at engine idling speeds and while at rest, a transmission for varying the driving ratio between the engine and the traction wheels, a coupling between the clutch and the transmission for transmitting torque in both directions, a hydraulic system including a pump, first and second cylinders with pistons therein operable respectively upon the clutch and coupling, an engine throttle member, control valves operated by the throttle member to introduce pumped liquid into the first cylinder and to cut off pumped liquid from the second cylinder as the throttle is actuated to cause torque to be delivered from the engine to supplement clutch packing pressure and for engagement of the coupling and operable to cut off pumped liquid from the first cylinder and to introduce pumped liquid in the second cylinder when the throttle member is actuated for engine idling speeds to relieve the clutch of supplemental pressure and to disengage the coupling, a low pressure relief valve, control valve means for connecting the low pressure relief valve into the hydraulic system when the throttle member is actuated to engine idling speeds, whereby high pressure is effective when the throttle member moves to engine idling speeds, and means for driving the pump from the engine and for driving the pump from the traction wheels when the engine is at rest.

20. A mechanism for transmitting power from the engine to the traction wheels of an automotive vehicle, or the like, comprising in combination, friction clutch means normally disengaged at engine idling speeds and while at rest, operating means for causing clutch engagement upon increase of the speed of rotation of the engine above idling speed, a transmission operable to change the driving ratios between the engine and the traction wheels, a shaft operable by the friction clutch means for the input of torque to the transmission, said transmission having a power output member operable with the traction wheels, a one-way coupling operable as the output member rotates due to movement of the vehicle to drive the said shaft and means operable by movement of the vehicle to cause engagement of the friction clutch means whereby to drive and start the engine by movement of the vehicle.

21. A mechanism for transmitting power from the engine to the traction wheels of an automotive vehicle or the like, comprising in combination, an automatic clutch normally disengaged at engine idling speeds and while at rest and engageable upon engine acceleration, a transmission operable to change the driving ratios between the engine and the traction wheels, a clutch driven shaft for the input of torque to the transmission, said transmission having a power output member operable with the traction wheels, a one-way coupling operable as the output member rotates due to movement of the vehicle to drive the clutch driven shaft, and means operable by movement of the vehicle to cause engagement of the automatic clutch, whereby to drive and start the engine by movement of the vehicle.

22. A mechanism for transmitting power from the engine to the traction wheels of an automotive vehicle or the like, comprising in combination, clutch means having driving and driven members with the driving member rotatable with the engine, said clutch means being normally disengaged at engine idling speeds and while at rest and automatically engageable upon increase of the speed of rotation of the engine above idling speed, a transmission operable to vary the driving ratios between the engine and the traction wheels, said transmission being connectable to the clutch driven member and having a power output member, said power output member being operable with the traction wheels, a one-way coupling operable as the power output member rotates due to movement of the vehicle while the engine is at rest to drive the said clutch driven member, and means operable incident to such movement of the vehicle to cause engagement of the clutch means whereby to drive and start the engine by movement of the vehicle.

23. A mechanism for transmitting power from the engine to the traction wheels of an automotive vehicle or the like, comprising in combination, friction clutch means having driving and driven members with the driving member rotatable with the engine, said clutch means being normally disengaged at engine idling speeds and while at rest and automatically engageable upon increase of the speed of rotation of the engine above idling speed, a transmission operable to vary the driving ratios between the engine and the traction wheels, said transmission being connectable to the clutch driven member and having a power output member, said power output member being operable with the traction wheels, a one-way coupling operable as the power output member rotates due to movement of the vehicle while the engine is at rest to drive the said clutch driven member, and means operable incident to such movement of the vehicle to cause engagement of the friction clutch means whereby to drive and start the engine by movement of the vehicle.

24. A mechanism for transmitting power from the engine to the traction wheels of an automotive vehicle or the like, comprising in combination, an automatic clutch normally open at engine idling speeds and while at rest, and engageable upon engine acceleration, a transmission operable to change the driving ratios between the engine and the traction wheels and having a power input member and a power output member, a shaft operated by the automatic clutch, a coupling between the shaft and the power input member for transmitting torque to the transmission and operable to establish and disestablish a connection between the shaft and the power input member, and means operable incident to movement of the vehicle while the engine is at rest for causing engagement of the automatic clutch whereby to drive and start the engine by movement of the vehicle.

25. A mechanism for transmitting power from the engine to the traction wheels of an automotive vehicle or the like, comprising in combination, a clutch normally open at engine idling speeds and while at rest, and engageable upon increase of the speed of rotation of the engine above engine idling speed, a transmission operable to change the driving ratios between the engine and the traction wheels and having a power input member and a power output member, a clutch shaft operated by the clutch, a coupling between the clutch shaft and the power input member for transmitting torque to the transmission and operable to establish and disestablish a connection between the clutch shaft and the power input member, means operated by the clutch shaft for causing engagement of the clutch independently of rotation of the engine and a one-way drive coupling for transmitting torque from said power output member to the clutch shaft.

ERNEST E. WEMP.

REFERENCES CITED

The following references are of record in the file of this patent:

UNITED STATES PATENTS

| Number | Name | Date |
|---|---|---|
| 1,137,804 | Sperry | May 4, 1915 |
| 2,170,649 | Banker | Aug. 22, 1939 |
| 2,259,730 | Burtnett | Oct. 21, 1941 |